United States Patent
Nelakonda et al.

(10) Patent No.: US 9,305,273 B2
(45) Date of Patent: Apr. 5, 2016

(54) TELEPHONE NUMBER USE ANALYSIS FOR GROUPING OF CONSECUTIVE TELEPHONE NUMBERS BASED ON ASSIGNMENT STATUS

(75) Inventors: Bharath Nelakonda, Leesburg, VA (US); Stephen P. Hetey, Leesburg, VA (US); Javier Sebastian Rizzo, Buenos Aires (AR); Martin Hill, Griesheim (DE)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 766 days.

(21) Appl. No.: 13/342,013

(22) Filed: Dec. 31, 2011

(65) Prior Publication Data
US 2013/0173534 A1 Jul. 4, 2013

(51) Int. Cl.
G06F 7/00 (2006.01)
G06Q 10/06 (2012.01)
G06Q 10/10 (2012.01)

(52) U.S. Cl.
CPC ............... G06Q 10/06 (2013.01); G06Q 10/10 (2013.01)

(58) Field of Classification Search
CPC .............................. G06Q 10/06; G06Q 10/10
See application file for complete search history.

(56) References Cited

U.S. PATENT DOCUMENTS

| | | | | |
|---|---|---|---|---|
| 5,945,990 A | * | 8/1999 | Morrison et al. | 715/748 |
| 5,970,488 A | * | 10/1999 | Crowe et al. | 707/656 |
| 6,201,856 B1 | * | 3/2001 | Orwick et al. | 379/40 |
| 6,298,352 B1 | * | 10/2001 | Kannan et al. | |
| 2001/0048738 A1 | * | 12/2001 | Baniak et al. | 379/201.02 |
| 2005/0101327 A1 | * | 5/2005 | Nam et al. | 455/436 |
| 2006/0148458 A1 | * | 7/2006 | Komaria et al. | 455/415 |
| 2006/0154661 A1 | * | 7/2006 | Gonen et al. | 455/435.1 |
| 2010/0150328 A1 | * | 6/2010 | Perreault et al. | 379/142.04 |
| 2011/0320449 A1 | * | 12/2011 | Gudlavenkatasiva | 707/737 |

* cited by examiner

*Primary Examiner* — Alex Gofman
*Assistant Examiner* — Michael Le

(57) ABSTRACT

A system may include a network device including a memory. The memory may store a first database including a plurality of records, wherein each record in the first database stores a telephone number (TN) and a status of the corresponding TN. the first database may stores information to indicate whether one of the records in the first database was updated. The memory may store a second database having a plurality of records. Each record in the second database may indicate a range of consecutive TNs from the first database having a same status. The system may include processors to run a first thread to update the one of the records in the first database. The processors may run a second thread to generate the second database from the first database in response to the stored information indicating that the one of the records in the first database was updated.

20 Claims, 13 Drawing Sheets

TELEPHONE NUMBER TABLE 302-3

| | TELEPHONE NO. 402 | STATUS 404 | UPDATE FLAG 406 | CUSTOMER 408 | HISTORY 410 |
|---|---|---|---|---|---|
| 452-1 | 2018917239 | AVAILABLE | NO | - | GRANTED 2011-09-01; AVAILABLE 2011-09-02 |
| 452-2 | 2018917240 | AVAILABLE | NO | - | GRANTED 2011-09-01; AVAILABLE 2011-09-02 |
| 452-3 | 2018917241 | AVAILABLE | NO | - | GRANTED 2011-09-01; AVAILABLE 2011-09-02 |
| 452-4 | 2018917242 | ALLOCATED | YES | 122-1 | GRANTED 2011-09-01; AVAILABLE 2011-09-02 |
| 452-5 | 2018917243 | ALLOCATED | YES | 122-1 | GRANTED 2011-09-01; AVAILABLE 2011-09-02 |
| 452-6 | 2018917244 | ALLOCATED | YES | 122-1 | GRANTED 2011-09-01; AVAILABLE 2011-09-02 |
| 452-7 | 2018917245 | AVAILABLE | NO | - | GRANTED 2011-09-01; AVAILABLE 2011-09-02 |
| 452-8 | 2018917246 | AVAILABLE | NO | - | GRANTED 2011-09-01; AVAILABLE 2011-09-02 |
| 452-9 | 2018917247 | AVAILABLE | NO | - | GRANTED 2011-09-01; AVAILABLE 2011-09-02 |

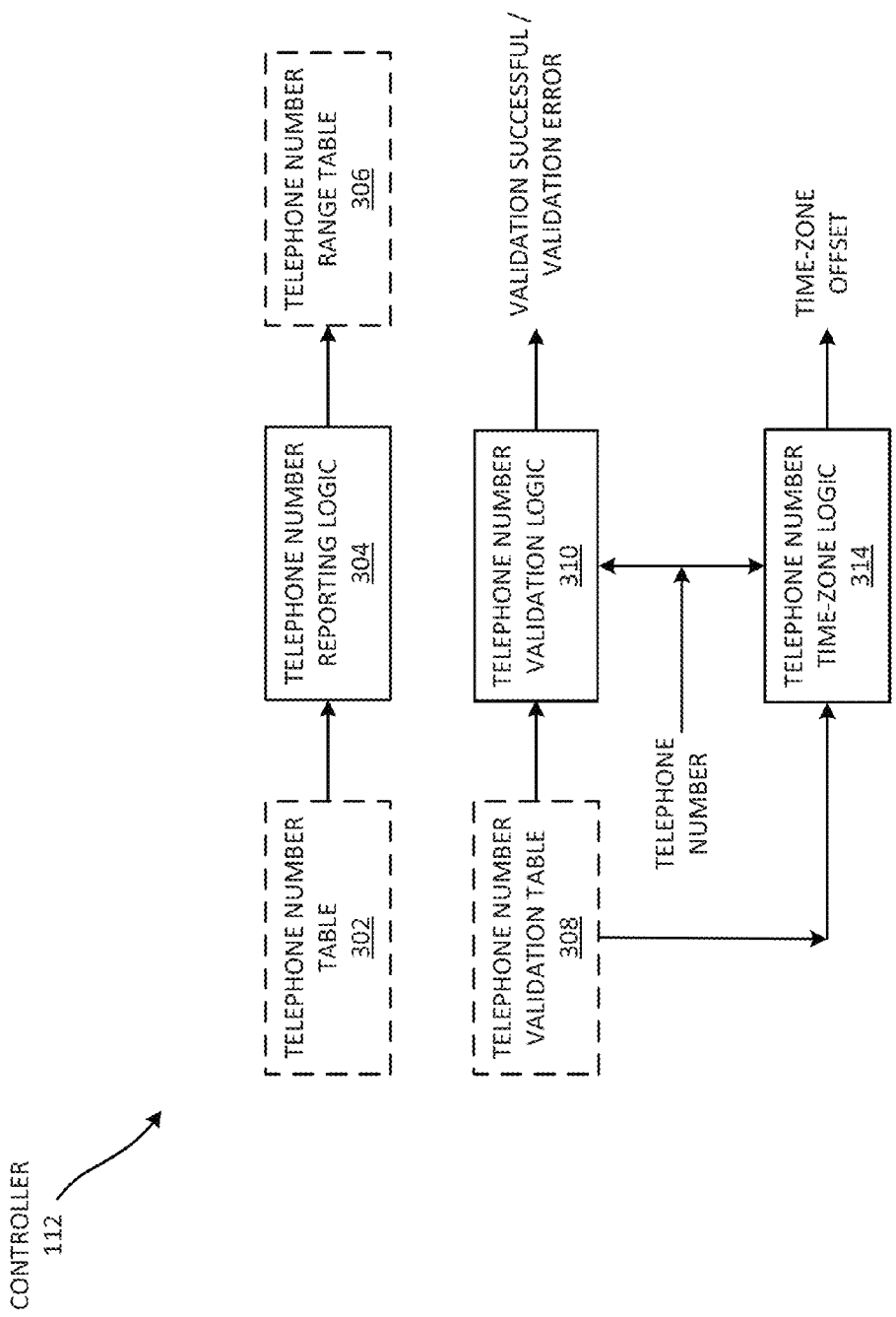

| TELEPHONE NUMBER TABLE 302-1 | | | | |
|---|---|---|---|---|
| TELEPHONE NO. 402 | STATUS 404 | UPDATE FLAG 406 | CUSTOMER 408 | HISTORY 410 |
| 2018917239 | GRANTED | NO | - | GRANTED 2011-09-01 |
| 2018917240 | GRANTED | NO | - | GRANTED 2011-09-01 |
| 2018917241 | GRANTED | NO | - | GRANTED 2011-09-01 |
| 2018917242 | GRANTED | NO | - | GRANTED 2011-09-01 |
| 2018917243 | GRANTED | NO | - | GRANTED 2011-09-01 |
| 2018917244 | GRANTED | NO | - | GRANTED 2011-09-01 |
| 2018917245 | GRANTED | NO | - | GRANTED 2011-09-01 |
| 2018917246 | GRANTED | NO | - | GRANTED 2011-09-01 |
| 2018917247 | GRANTED | NO | - | GRANTED 2011-09-01 |

FIG. 4A

| TELEPHONE NUMBER TABLE 302-2 | | | | |
|---|---|---|---|---|
| TELEPHONE NO. 402 | STATUS 404 | UPDATE FLAG 406 | CUSTOMER 408 | HISTORY 410 |
| 2018917239 | AVAILABLE | YES | - | GRANTED 2011-09-01 |
| 2018917240 | AVAILABLE | YES | - | GRANTED 2011-09-01 |
| 2018917241 | AVAILABLE | YES | - | GRANTED 2011-09-01 |
| 2018917242 | AVAILABLE | YES | - | GRANTED 2011-09-01 |
| 2018917243 | AVAILABLE | YES | - | GRANTED 2011-09-01 |
| 2018917244 | AVAILABLE | YES | - | GRANTED 2011-09-01 |
| 2018917245 | AVAILABLE | YES | - | GRANTED 2011-09-01 |
| 2018917246 | AVAILABLE | YES | - | GRANTED 2011-09-01 |
| 2018917247 | AVAILABLE | YES | - | GRANTED 2011-09-01 |

FIG. 4B

| TELEPHONE NUMBER TABLE 302-3 | | | | |
|---|---|---|---|---|
| TELEPHONE NO. 402 | STATUS 404 | UPDATE FLAG 406 | CUSTOMER 408 | HISTORY 410 |
| 2018917239 | AVAILABLE | NO | - | GRANTED 2011-09-01; AVAILABLE 2011-09-02 |
| 2018917240 | AVAILABLE | NO | - | GRANTED 2011-09-01; AVAILABLE 2011-09-02 |
| 2018917241 | AVAILABLE | NO | - | GRANTED 2011-09-01; AVAILABLE 2011-09-02 |
| 2018917242 | ALLOCATED | YES | 122-1 | GRANTED 2011-09-01; AVAILABLE 2011-09-02 |
| 2018917243 | ALLOCATED | YES | 122-1 | GRANTED 2011-09-01; AVAILABLE 2011-09-02 |
| 2018917244 | ALLOCATED | YES | 122-1 | GRANTED 2011-09-01; AVAILABLE 2011-09-02 |
| 2018917245 | AVAILABLE | NO | - | GRANTED 2011-09-01; AVAILABLE 2011-09-02 |
| 2018917246 | AVAILABLE | NO | - | GRANTED 2011-09-01; AVAILABLE 2011-09-02 |
| 2018917247 | AVAILABLE | NO | - | GRANTED 2011-09-01; AVAILABLE 2011-09-02 |

TELEPHONE RANGE TABLE 306-2

| TELEPHONE NOS. 422 | STATUS 424 | CUSTOMER 428 | HISTORY 430 |
|---|---|---|---|
| 2018917239 - 2018917241 | AVAILABLE | - | GRANTED 2011-09-01; AVAILABLE 2011-09-02 |
| 2018917242 - 2018917244 | ALLOCATED | 122-1 | GRANTED 2011-09-01; AVAILABLE 2011-09-02 |
| 2018917245 - 2018917247 | AVAILABLE | - | GRANTED 2011-09-01; AVAILABLE 2011-09-02 |

VALIDATION TABLE 308

| COUNTRY CODE 512 | AREA CODE 514 | GEO. NAME 516 | TN MIN. LENGTH 518 | TN MAX. LENGTH 520 | LINE TYPE 522 | TIME ZONE OFFSET 524 | DST RANGE 526 | DST OFFSET 528 |
|---|---|---|---|---|---|---|---|---|
| USA | 201 | NEW JERSEY | 10 | 10 | GEO, MOBILE | -5:00 | 2011/03/13 2011/11/06 | -4:00 |
| USA | 609 | NEW JERSEY | 10 | 10 | GEO, MOBILE | -5:00 | 2011/03/13 2011/11/06 | -4:00 |
| CHE | 044 | ZURICH | 9 | 9 | GEO | +1:00 | 2011/03/27 2011/10/30 | +2:00 |
| CHE | 075 | GSM/ UMTS | 9 | 9 | MOBILE | +1:00 | 2011/03/27 2011/10/30 | +2:00 |
| AUS | 08946 | SYDNEY | 10 | 10 | GEO | +10:00 | 2011/10/02 2012/04/01 | +11:00 |
| AUS | 0292 | SYDNEY | 10 | 10 | GEO | +10:00 | 2011/10/02 2012/04/01 | +11:00 |

552-1
552-2
552-3
552-4
552-5
552-6

TELEPHONE NUMBER USE ANALYSIS FOR GROUPING OF CONSECUTIVE TELEPHONE NUMBERS BASED ON ASSIGNMENT STATUS

BACKGROUND INFORMATION

A private branch exchange (PBX) is a telephone exchange that may serve a particular business or office, as opposed to an exchange that a common carrier or telephone company may operate for the general public. A PBX, for example, may connect the internal telephones of a private organization and also may connect the internal telephones to a public switched telephone network (PSTN) via trunk lines. A Central exchange (Centrex) is a PBX-like service providing switching at a central office (e.g., at the telephone company) rather than at the private organization's premises. In this case, the telephone company may own and manage the communications equipment (e.g., a switch) and software to implement the Centrex service. The telephone company may sell the services to the private organization (e.g., the customer).

BRIEF DESCRIPTION OF THE DRAWINGS

FIG. 3 is a block diagram of exemplary components of the controller of FIG. 1;

FIGS. 4A, 4B, and 4C are block diagrams of exemplary telephone number tables;

FIGS. 4D and 4E are block diagrams of exemplary telephone number range tables;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

PBXs and Centrex groups may be assigned blocks of telephone numbers (TNs). Thus, a university may, for example, be assigned a block of 10,000 TNs for its 9,000 current students to use. Individuals may also be assigned TNs. TNs, however, are a limited resource and an excessive number of unused TNs by many PBXs or Centrex groups may unduly limit the use of TNs by other customers. A national regulator (e.g., the Federal Communications Commission (FCC)) may regulate the use of TNs to limit the amount of numbers that are set aside for use by a customer but are not being used to provide service on a regular basis.

Embodiments described herein allow for databases of TNs to be updated while also allowing for the database to be analyzed for display and reporting. In one embodiment, TNs may also be validated based on information (e.g., format information) stored in a database, without having to update code for new areas or countries. In another embodiment, the time-zone offset (e.g., offset from Greenwich Mean Time (GMT)) may be calculated based on known information about a telephone number.

Figure 1:
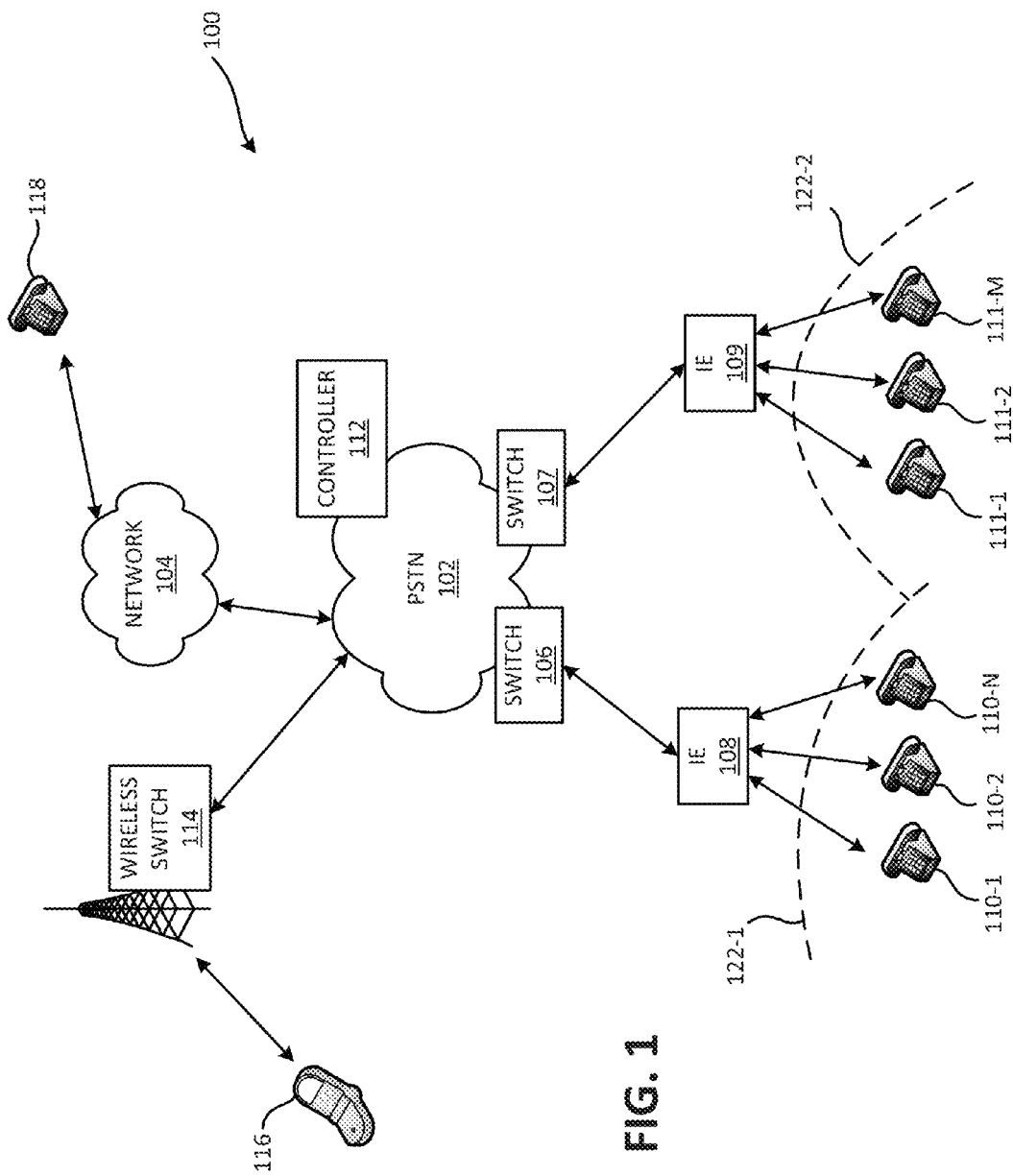
FIG. 1 is a diagram of an exemplary network for implementing embodiments described herein.

FIG. 1 is a diagram of an exemplary network 100 for implementing embodiments described herein. Network 100 may include a public switch telephone network (PSTN) 102, a network 104, switches 106 and 107, intermediary equipment (IE) 108 and 109, telephones 110-1 through 110-N (collectively phones 110, individually phone 110-x), telephones 111-1 through 111-M (collectively phones 111), a controller 112, a wireless switch 114, a mobile device 116, and a telephone 118.

Phones 110 may be associated with a first customer premises 122-1 and a PBX or Centrex group assigned to a first block of TNs. Phones 110 may include any type of residential, business, and/or mobile phone that may be connected to PSTN 102 through intermediary equipment 108 and switch 106. In one embodiment, phones 110 may each be associated with one or more TNs in the block of TNs associated with the PBX or Centrex group associated with customer premises 122-1.

Intermediary equipment 108 may include a telephone network box, telephone poles, an entrance bridge, a digital concentrator, fiber-optic cables, digital equipment, etc. Switch 106 may include a class 5 telephone switch, such as a 5ESS switch made by Alcatel-Lucent. Controller 112 may provide administration and management of switch 106. Switch 106 may include switching modules to switch signals (e.g., telephone calls) by interpreting dialed digits and connecting calls between telephones, for example.

Controller 112 may define groups or blocks of TNs to assign to PBXs and/or Centrex groups, may analyze the use of the assigned TNs, and may remove TNs from blocks of TNs assigned to PBXs and/or Centrex groups.

Wireless switch 114 may control traffic and signaling with a mobile device (e.g., mobile device 116). Wireless switch 114 may include an antenna to transmit and receive signals to and from mobile device 116. Mobile device 116 may include a mobile phone, a tablet computer, a laptop, or another portable communication device. Even though mobile device 116 is not in customer premises 122-1, it may still be associated with the same PBX or Centrex group as phones 110, for example.

Network 104 may include one or more packet switched networks, such as an Internet protocol (IP) based network, a local area network (LAN), a wide area network (WAN), a personal area network (PAN), an intranet, the Internet, or another type of network that is capable of transmitting data. Network 104 may also include a circuit-switched network, such as a PSTN (similar to PSTN 102) for providing telephone services for traditional telephones. Phone 118 may be coupled to network 104 and may use a packet-based protocol for establishing calls and transmitting media (e.g., session initiation protocol (SIP) and/or real-time protocol (RTP)). While phone 118 may not be physically located at customer premises 122-1, phone 118 may be associated with the same PBX or Centrex group as phones 110, for example.

Phones 111 may be associated with a second customer premises 122-2 and a PBX or Centrex group assigned to a second block of TNs different than the block of TNs associated with first customer premises 122-1. Phones 111 may be connected to PSTN 102 through intermediary equipment 109 and switch 107. In one embodiment, phones 111 may each be associated with one or more TNs in the block of TNs associated with the PBX or Centrex group associated with second customer premises 122-2. Phones 111, intermediary equipment 109, and switch 107 may be configured and operate similarly to phones 110, intermediary equipment 108, and switch 106 discussed above.

The exemplary configuration of devices in network 100 is illustrated for simplicity. Network 100 may include more devices, fewer devices, or a different configuration of devices than illustrated in FIG. 1. For example, network 100 may include thousands or millions of customer premises, each associated with a PBX or Centrex group and telephones. In some embodiments, the functions performed by two or more devices may be performed by any one device. Likewise, in some embodiments, the functions performed by any one device may be performed by multiple devices. Further, the connections shown in FIG. 1 are exemplary. In other embodiments, additional connections that are not shown in FIG. 1 may exist between devices (e.g., each device may be connected to every other device).

Figure 2:
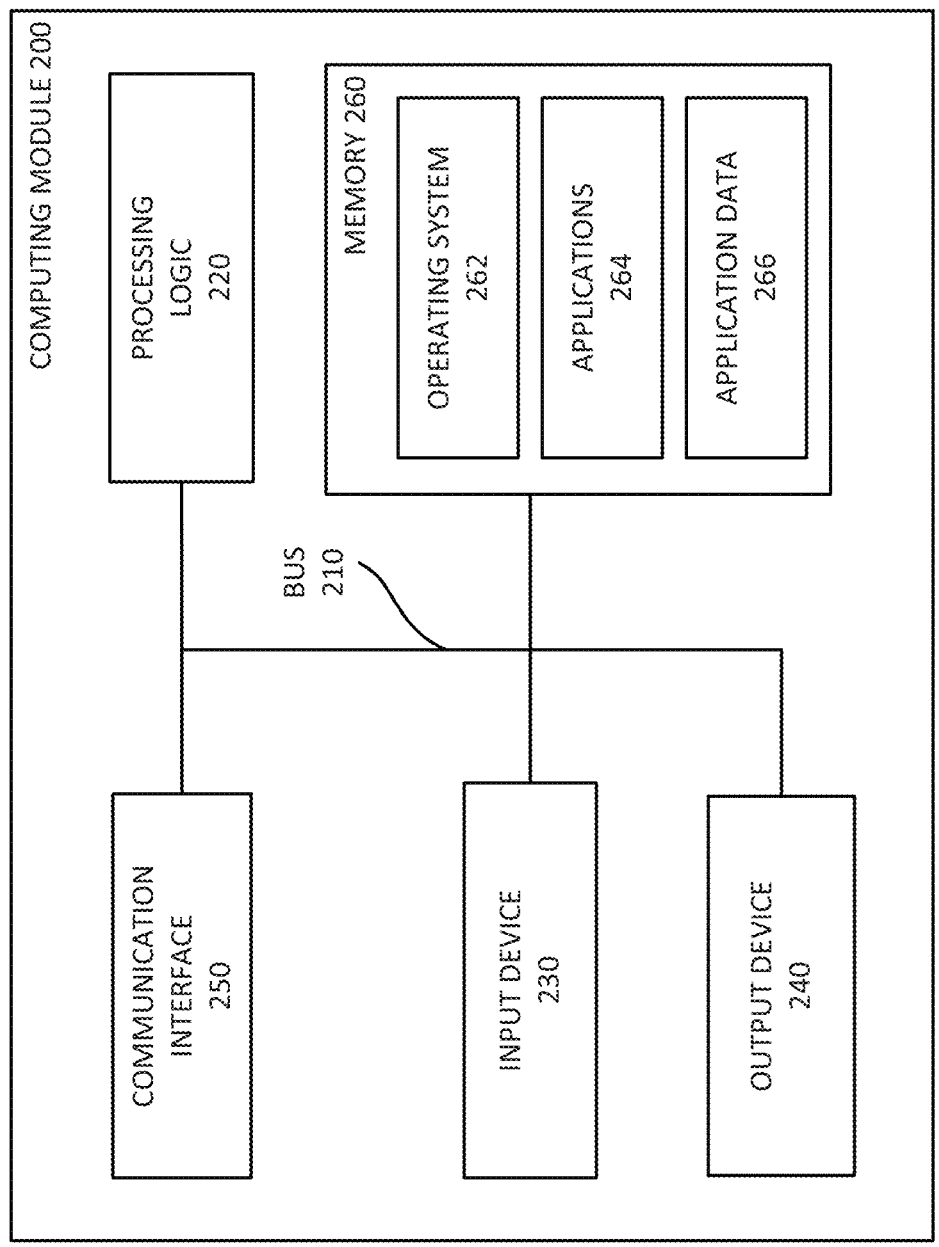
FIG. 2 is a block diagram of exemplary components of a computing module.

Devices in network 100 may include one or more computing modules. FIG. 2 is a block diagram of exemplary components of a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 includes a path that permits communication among the components of computing module 200. Processing logic 220 may include any type of processor or microprocessor (or families of processors or microprocessors) that interprets and executes instructions. In other embodiments, processing logic 220 may include an application-specific integrated circuit (ASIC), a field-programmable gate array (FPGA), etc.

Input device 230 may allow computing module 200 to input information (e.g., from a user) into computing module 200. Input device 230 may include a keyboard, a mouse, a pen, a microphone, a remote control, a touch-screen display, etc. Some devices, such as switch 106, may be managed remotely (e.g., are "headless") and may not include a keyboard, etc.

Output device 240 may output information (e.g., to the user). Output device 240 may include a display, a printer, a speaker, etc. For example, controller 112 may include a display that includes a liquid-crystal display (LCD) for displaying menus and content to the user. Headless devices, such as switch 106, may be managed remotely and may not include a display, etc.

Input device 230 and output device 240 may allow the user to activate and interact with a particular service or application, such as an application to manage TNs in PBX or Centrex groups. Input device 230 and output device 240 may allow the user to receive and view a menu of options and select from the menu options. The menu may allow the user to select various functions or services associated with applications executed by computing module 200.

Communication interface 250 may include a transceiver that enables computing module 200 to communicate with other devices. Communication interface 250 in switch 106, for example, may include a number of switching modules to perform switching operations by interpreting dialed digits and connecting calls between telephones. Communication interface 250 may include a transmitter that, for example, converts baseband signals to radio frequency (RF) signals. Communication interface 250 may include a receiver that, for example, converts RF signals to baseband signals. Communication interface 250 may be coupled to an antenna for transmitting and receiving signals. Communication interface 250 may include a network interface card, e.g., an Ethernet or WiFi card, for wired or wireless communications.

Memory 260 may store, among other things, information and instructions (e.g., applications 264 and operating system (OS) 262) and data (e.g., application data 266) for use by processing logic 220. Memory 260 may include a random access memory (RAM) or another type of dynamic storage device, a read-only memory (ROM) device or another type of static storage device. Memory 260 may include a magnetic or optical recording medium and its corresponding drive (e.g., a hard disk drive).

OS 262 may include software instructions for managing hardware and software resources of computing module 200. For example, OS 262 may include Unix, Linux, OS X, Solaris, an embedded operating system, etc. Applications 264 and application data 266 may provide network services or include applications, depending on the device in which the particular computing module 200 is found. For example, controller 112 may include an application to manage TNs in PBX or Centrex groups.

Computing module 200 may perform the operations described herein in response to processing logic 220 executing software instructions contained in a non-transient computer-readable medium, such as memory 260. The software instructions may be read into memory 260 from another computer-readable medium or from another device via communication interface 250. The software instructions contained in memory 260 may cause processing logic 220 to perform processes that are described herein.

As discussed above, in one embodiment, controller 112 may control and handle blocks of TNs for PBX or Centrex groups. FIG. 3 is a block diagram of exemplary components of controller 112 (e.g., functions performed by application 264 in processing logic 220 or stored in memory 260 of controller 112). Controller 112 may include a telephone number table 302, telephone number reporting logic 304, a telephone number range table 306, a telephone number validation table 308, telephone number validation logic 310, and telephone number time zone logic 314. Some components shown in FIG. 3 may also be stored in other devices in network 100. For example, TN table 302 may also or alternatively be stored in switch 106. TN table 302, range table 306, and validation table 308 may each also be considered a "database." Further, tables 302, 306, and 308 may each be stored in a single database or different databases.

TN table 302 stores information related to telephone numbers, such as the customer associated with TNs and the status of the TNs. FIG. 4A is a block diagram of an exemplary TN table 302-1. As used here, a "-1" suffix indicates one instance of TN table 302 or snapshots of TN table 302 at different times. Other suffixes (e.g., "-2" or "-3") indicate other instances of TN table 302 or snapshots of TN table 302 at different times. For example, FIG. 4B shows TN table 302-2 (e.g., TN table 302 at a different point in time), and FIG. 4C shows TN table 302-3 (e.g., TN table 302 at a different point in time).

A record (e.g., an entry) 452-$x$ in TN table 302 may associate a telephone number with a customer (e.g., a PBX or Centrex group) and may provide the status for the corresponding telephone number. As shown in FIG. 4A, TN table 302-1 may include a telephone number field 402, a status field 404, an update flag field 406, a customer field 408, and a history field 410. TN table 302 may include additional, different, or fewer fields than illustrated in FIG. 4A.

TN field 402 specifies a TN associated with the information stored in the other fields (e.g., fields 404-410). An exemplary value in TN field 404 is "2018917239" in record 452-1. While TN field 402 shows consecutive TNs in records 452-1 through 452-9, the numbers in TN table 302 do not have to be consecutive. For example, a TN may be removed from TN table 302 and returned to the regulator.

Status field 404 specifies the status (e.g., granted, free, available, allocated, working, etc.) A "granted" TN indicates a TN that has been granted to the carrier from a national regulator, for example, but is not yet available for a customer to use. After a TN has been granted to a carrier, information about that TN may be propagated to network switches of other carriers so that when the TN is called, the call will be routed to the correct carrier, for example. An "available" TN indicates a TN that is ready to be assigned or allocated to a customer. An "allocated" or "working" TN indicates a TN that has been assigned to a customer and, when called, rings a telephone, such as telephone 110-$x$.

Update flag field 406 indicates whether information in any of the other corresponding fields (e.g., status field 404 or customer field 408) has been updated or changed. This information in flag field 406 may be monitored by processes that analyze and generate reports about the information stored in TN table 302. For example, a YES in update flag field 406 of record 452-4 may prompt a process that analyzes the TNs in TN table 302. After the analysis, the process may reset update flag field 406 of record 452-1 to NO. In one embodiment rather than associating each record 452-$x$ with an update flag field 406, the entire TN table 302 may be associated with a single update flag field that is switched from "NO" to "YES" when any record 452-$x$ is updated. In this way, a process may run to analyze the information in TN table 302 whenever this flag is switched from "NO" to "YES."

Customer field 408 may include a value to identify (e.g., uniquely identify) a customer (e.g., a customer, a PBX group, a Centrex group, etc.). TN table 302-1 and TN table 302-2 do not specify any customer for any TNs. TN table 302-3, on the other hand, specifies that the customer associated with customer premises 122-1 is associated with TNs 2018917242, 2018917243, and 2018917244, for example.

History field 410 may store historical information about the corresponding TN. For example, history field 410 may store the periods of time during which the corresponding TN has been allocated, the customer associated with the TN, etc. As such, history field 410 may store previous customer information to which the TN was previously allocated.

One characteristic of TN table 302, in one embodiment, is that each TN is associated with its own record or entry in the table. In this embodiment, each TN may have properties of its own (e.g., its own status field 404, update flag field 406, customer field 408, and/or history field 410). As discussed below, range table 306 may group consecutive TNs that have similar properties.

Figure 4D:

Returning to FIG. 3, reporting logic 304 may analyze the data in TN table 302 to display information and report on the information. In one embodiment, reporting logic 304 generates range table 306. Range table 306 may group consecutive TNs (e.g., ranges of TNs) that have the same or similar properties. Reporting logic 304 is discussed in more detail below with respect to FIGS. 6A and 6B. FIG. 4D is a block diagram of range table 306-1. As used here, a "-1" suffix indicates one instance of range table 306 or snapshots of range table 306 at different times. Other suffixes (e.g., "-2") indicate other instances of range table 306 or snapshots of range table 306 at a different times. For example, FIG. 4E shows range table 306-2 (e.g., range table 306 at a different point in time).

A record (e.g., an entry) 454-$x$ in range table 306-1 may associate a range of TNs with a customer (e.g., a PBX or Centrex group) and may provide status and history information for the corresponding range of TNs. As shown in FIG. 4D, range table 306-1 may include TN range field 422, a status field 424, a customer field 428, and a history field 430. Range table 306-1 may include additional, different, or fewer fields than illustrated in FIG. 4D.

TN range field 422 may store the same information as described above for TN field 402, but range field 422 may specify two TNs: a start TN and an end TN. The start TN and the end TN specify a range of TNs associated with the information stored in status field 424, customer field 428, and history field 430. For example, record (e.g., entry 454-1) indicates a range of TNs from 2018917239 to 2018917247.

Status field 424, customer field 428, and history field 430 may all store information similar to the information discussed above for status field 404, customer field 408, and history field 410 of TN table 302. The information stored in status field 424, customer field 428, and history field 430 correspond to the TNs stored in TN range field 422.

Figure 5:
FIG. 5 is a block diagram of an exemplary telephone number validation table.

Returning to FIG. 3, validation table 308 stores information to validate (e.g., verify the proper format) of TNs. Validation logic 310 uses the information in validation table 308 to validate TNs. Validation logic 310 is discussed below in more detail with respect to FIG. 6C. FIG. 5 is a block diagram of exemplary validation table 308. Validation table 308 may include a country code field 512, an area code field 514, a geographic name field 516, a TN minimum length field 518, a TN maximum length field 520, a line type field 522, a time-zone offset field 524, a daylight saving time (DST) range field 526, and a DST offset field 528. Validation table 308 may include additional, different, or fewer fields than illustrated in FIG. 5.

Country code field 512 may specify the country for which the information in the remaining fields of validation table 308 apply. For example, record 552-1 (e.g., record 552-1) specifies "USA" (e.g., the United States of America) as the country. Area code field 514 specifies the numeric code that is associated with a particular geographic region or group of TNs, for example. Geographic name field 516 specifies the name of the corresponding geographic region. For example, record 552-1 specifies New Jersey as the geographic region corresponding to the area code "201" specified in area code field 514.

TN minimum length field 518 specifies the minimum length allowed for a TN for the corresponding country code, area code, geographic region, etc. TN maximum length field 520 specifies the maximum length allowed for a TN that meets the other criteria in a corresponding record (e.g., country code field 512, area code field 514, geographic name field 516). Line type field 522 specifies the type of telephone line associated with the corresponding record (e.g., the corresponding area code). For example, record 552-4 specifies that the area code 075 for the country Switzerland (CHE) corresponds to TNs for mobile devices. On the other hand, record 552-3 for the area code 044 for Switzerland (CHE) indicates that the TNs correspond to geographic (e.g., "land" or "fixed") lines.

Time-zone offset field 524 specifies the time-zone offset from Greenwich Mean Time (GMT) that corresponds to the geographic area (e.g., specified in geographic name field 516) or the area code (e.g., specified in area code field 514). DST offset field 528 specifies the time offset from GMT during the daylight saving time period specified in DST range field 526. DST range field 526 specifies the time periods during which daylight saving time applies for the corresponding record (e.g., for the place specified in geographic name field 516, area code field 514, and/or country code 512). For example, from Oct. 2, 2011 to Apr. 1, 2012, daylight saving time applies for Australia area code 08946 for Sydney, as specified in record 552-5.

In one embodiment, validation table 308 may be split into two tables, one for the validation of TNs and one for time-zone offset. In such an embodiment, the table for validating TNs (e.g., a "homing plan") may include country code field 512, area code field 514, geographic name field 516, TN minimum length field 518, and/or TN maximum length field 520, for example. The table for determining the time-zone offset may include country code field 512, area code field 514, geographic name field 516, time-zone offset field 524, DST range field 526, and/or DST offset field 528, for example.

Returning to FIG. 3, time-zone logic 314 may determine the current time-zone offset for a TN. Time-zone logic 314 may use the information in validation table 308 (e.g., country code field 512, area code field 514, geographic name field 516, time-zone offset field 524, DST range field 526, and/or DST offset field 528) to determine the current time-zone offset. Time-zone logic 314 is discussed in more detail below with respect to FIG. 6D.

Figure 6A:
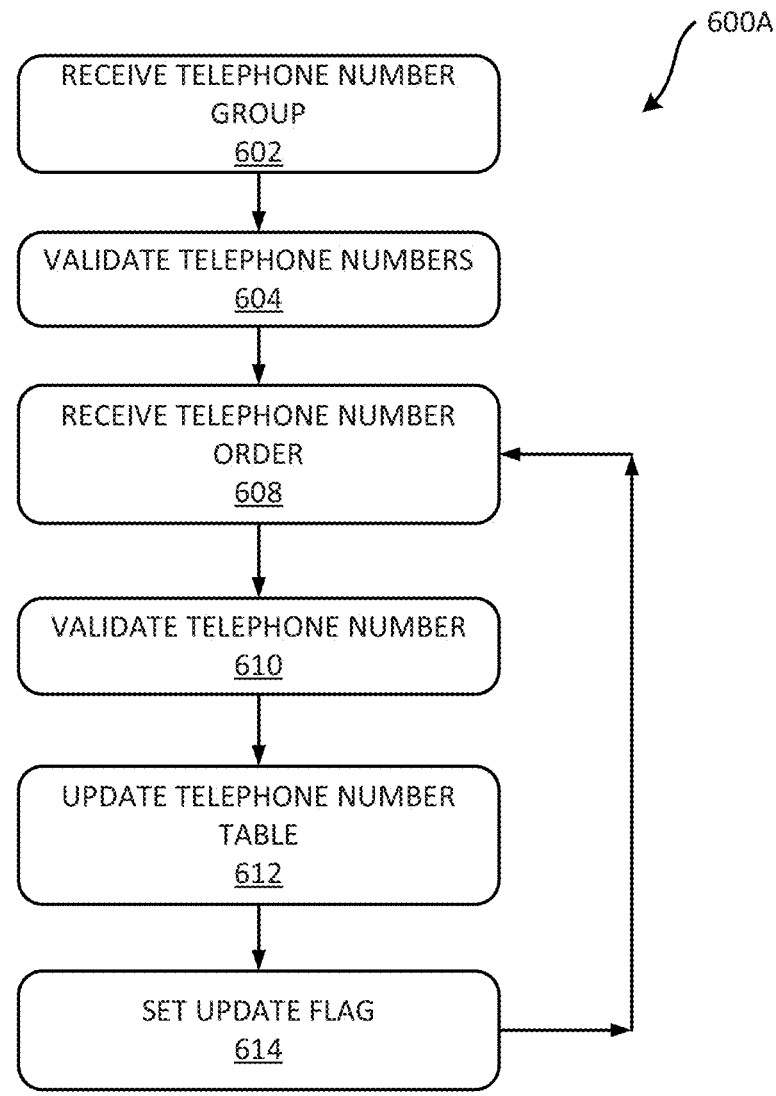
FIG. 6A is a flowchart of a process for the intake of blocks of telephone numbers in one embodiment.

As discussed above, controller 112 may receive TNs from a national regulator for assigning to customers. FIG. 6A is a flowchart of a process 600A for the intake of TNs in one embodiment. Process 600A begins with the receiving of a group or block of TNs (block 602). For example, a carrier may receive a group of consecutive TNs from a national regulator. The TNs in the received group may be considered "granted" but may not yet be ready for assignment to a customer. In this example, TN table 302-1, shown in FIG. 4A, shows a group of consecutive TNs received. As shown, the status of each TN is indicated as "granted." No customer is listed in TN table 302-1 shown in FIG. 4A because the TNs have not yet been associated with a customer. The history of each TN listed in history field 410, shown in FIG. 4A, includes the date each TN was granted to the carrier.

The TNs in the group or block may be validated (block 604). Validation may include ensuring that the TNs have the right properties, such as the properties listed in validation table 308, shown in FIG. 5. For example, the TNs may be checked to determine whether each TN has the correct length, starts with the correct prefix (e.g., area code), corresponds to the correct country, corresponds to the correct geographic area (e.g., city), etc. A further description of validating TNs is provided below with respect to FIG. 6C.

An order may be received regarding a TN in the group of TNs (block 608). For example, after grant, an order may include making the TNs available for allocation to customers. In this case, information about each TN may be propagated to switches in the carrier's network as well as to the switches of other carriers' networks. In this way, should a telephone call be placed to a TN in the group of TNs, a call would be routed to the appropriate carrier even though it may not yet be assigned to a customer. Before or during the processing of the order, each TN may be validated again (block 610) to ensure that the TN has the proper properties.

The TN table may be updated (block 612). As shown in TN table 302-2 (FIG. 4B), as a result of the order discussed above with respect to block 608, the status (stored in status field 404) for each TN has been changed to "available." Further, for each updated record in TN table 302-2, an update flag may be switched from "NO" to "YES" (block 614). In one embodiment the entire TN table 302 may be associated with a single update field that is switched from "NO" to "YES" when any record 452-x is updated (block 614). Update flag field 406 may allow a separate process (e.g., a parallel process or thread) to run an analysis for generating reports or displaying information to the user. Such a process to run the analysis is described in more detail below with respect to FIG. 6B. In one embodiment, that process may also reset the update flags to "NO." For example, as shown in TN table 302-3 in FIG. 4C, the update flag field 406 of record 452-1 has been reset from "YES" to "NO."

Process 600A may loop and another TN order may be received (block 608). For example, the customer associated with premises 122-1 may contact the carrier and have TNs assigned to it. In this case, the received order (block 608) associates the TN with the customer's location and/or devices 110-x. In this case, information about the association may be propagated to switches and equipment in network 100 for proper routing of the call. Before or during the processing of the order, each TN may be validated again (block 610) to ensure that the TN has the proper properties. A further description of validating TNs is provided below with respect to FIG. 6C.

TN table 302-2 may be updated (block 612) to associate the customer with the TNs, as shown in TN table 302-3 in FIG. 4C. In the current example, TN table 302-3 indicates that the following three numbers are associated with the customer in premises 122-1: 2018917242, 2018917243, and 2018917244. In the current example, records 452-4, 452-5, and 453-6 are updated so that the flags corresponding to the allocated TNs are set to "YES." An update flag of "YES" indicates to a process, discussed below, that an analysis for reporting and display purposes may be run.

Figure 6B:
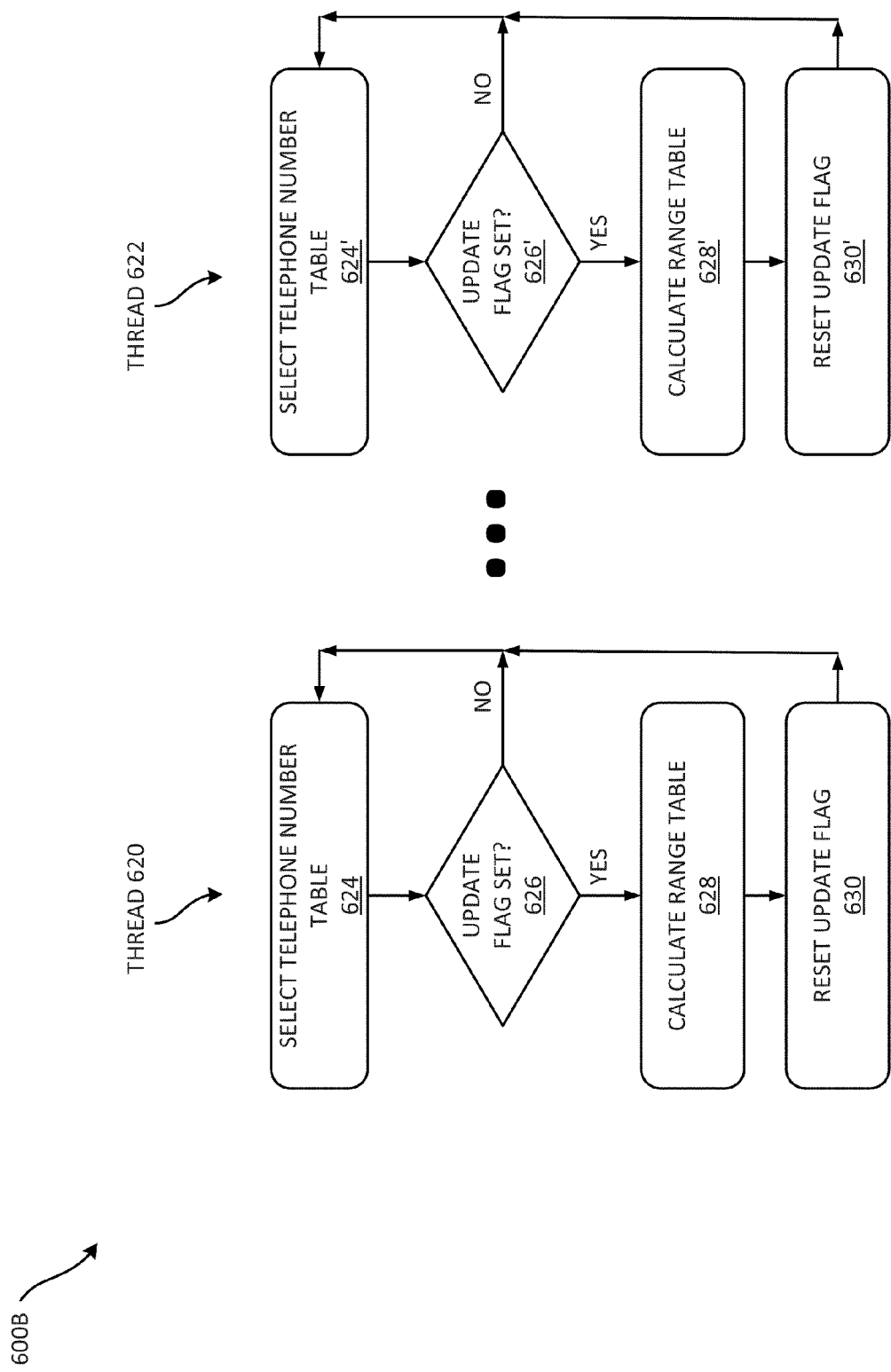
FIG. 6B is a flowchart of a process for generating a telephone number range table when updating telephone number tables in one embodiment.

As discussed above, a process for analyzing TNs for reporting and display purposes may run when an update occurs to TN table 302 (e.g., as indicated in update flag field 406). FIG. 6B is a flowchart of a process 600B for analyzing TN tables for display and for reporting in one embodiment. In one embodiment, process 600B may include multiple threads. In FIG. 6B, for example, process 600B includes a first thread 620 and a second thread 622. Each thread may operate on different groups of TNs. For example, thread 620 may operate on TN table 302 and thread 622 may operate on a different TN table. Further, threads 620 and 622 may operate in parallel to process 600A described above with respect to FIG. 6A.

Process 600B begins with the selection of a TN table (block 624). For example, thread 620 may select TN 302. If an update flag is set (e.g., if an update flag is YES) (block 626: YES), then the thread may calculate a range table. In the example where thread 620 has selected TN table 302-2 (shown in FIG. 4B), if any record stores a YES in update flag field 406, then thread 620 calculates a range table.

For example, if TN table 302 is in the state shown in FIG. 4A (e.g., TN table 302-1), then process thread 620 determines that there is no update flag set (block 626: NO), and thread 620 may select another, different TN table (block 624). On the other hand, if TN table 302 is in the state shown in FIG. 4B (e.g., TN table 302-2), then thread 620 determines that an update flag has been set (e.g., update flag field 406 includes a YES in record 452-1) (block 626: YES). Therefore, thread 620 would proceed to calculate a range table (block 628). In this case, thread 620 may generate range table 306-1 as shown in FIG. 4D and described above. As another example, if TN table 302 is in the state shown in FIG. 4C (e.g., TN table 302-3), then thread 620 determines that an update flag is set (e.g., update flag field 406 includes a YES in record 452-4) (block 626: YES). In this case, thread 620 may generate a range table 306-2 as shown in FIG. 4E and described above. The update flags are reset (block 630) after, for example, the range table is calculated. In this fashion, thread 620 (or another thread in process 600B) does not calculate a range table for a TN block unnecessarily. In the case of generating range table 306-1, the update flags in records 452-1 through 452-9 may be reset to "NO." In the case of generating range table 306-2, the update flags in 452-4 through 452-6 may be reset to "NO."

Having generated range table 306, the information in TN table 302 may more easily be displayed, analyzed, and reported. Further, process 600A may be decoupled from process 600B (e.g., different running threads). This decoupling may allow for rapid updating of TN table 302 without having to wait for an analysis process (e.g., process 600B) to run, for example.

Figure 6C:
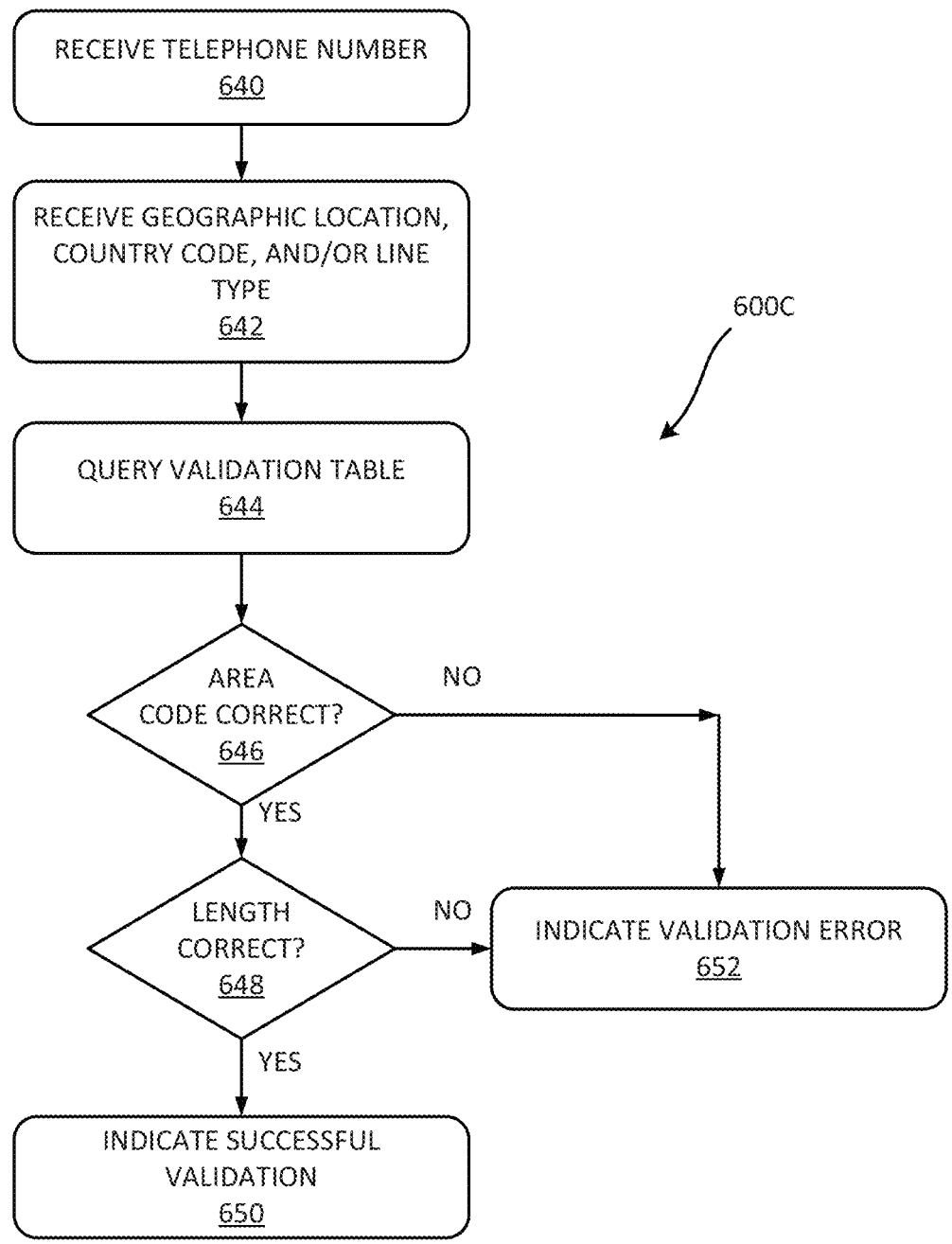
FIG. 6C is a flowchart of a process for validating telephone numbers in one embodiment.

As discussed above, process 600A may validate TNs (e.g., blocks 604 and 610). Process 600B may also validate TNs. FIG. 6C is a flowchart of an exemplary process 600C for validating TNs in one embodiment. Controller 112 may perform process 600C. As shown, process 600C begins with receipt of a TN for validating (block 640). Other information may be received along with the TN, such as the geographic location, the country code, and/or the line type (block 642). This information may correspond to the information stored in validation table 308 (e.g., country code field 512, area code field 514, geographic name field 516, and/or line type field 522).

The validation table is queried (block 644) with the information received with respect to blocks 640 and 642. Process 600C determines if the information received (e.g., with respect to blocks 640 and 642) is consistent with a valid TN. The area code and/or geographic area of the received TN may be checked against validation table 308 for consistency. For example, the area code may be checked to determine if it is correct (e.g., if the received area code/received geographic code pair match an entry in validation table 308). If the area code of the TN is not correct (block 646: NO), then a validation error is indicated (block 652).

The length of the received TN may also be checked against validation table 308 for consistency. If the length is not correct (e.g., shorter than the minimum length or longer than the maximum length) (block 648: NO), then a validation error code is also indicated (block 652). If the length of the TN is correct (block 648: YES) and the area code is correct (block 646: YES), then a successful validation is indicated (block 650).

A TN may be validated at any time during processes 600A, 600B, or other processes not disclosed herein. Validation may help eliminate human error and/or programming error when generating and/or updating TN table 302 and/or range table 306, for example.

Figure 6D:
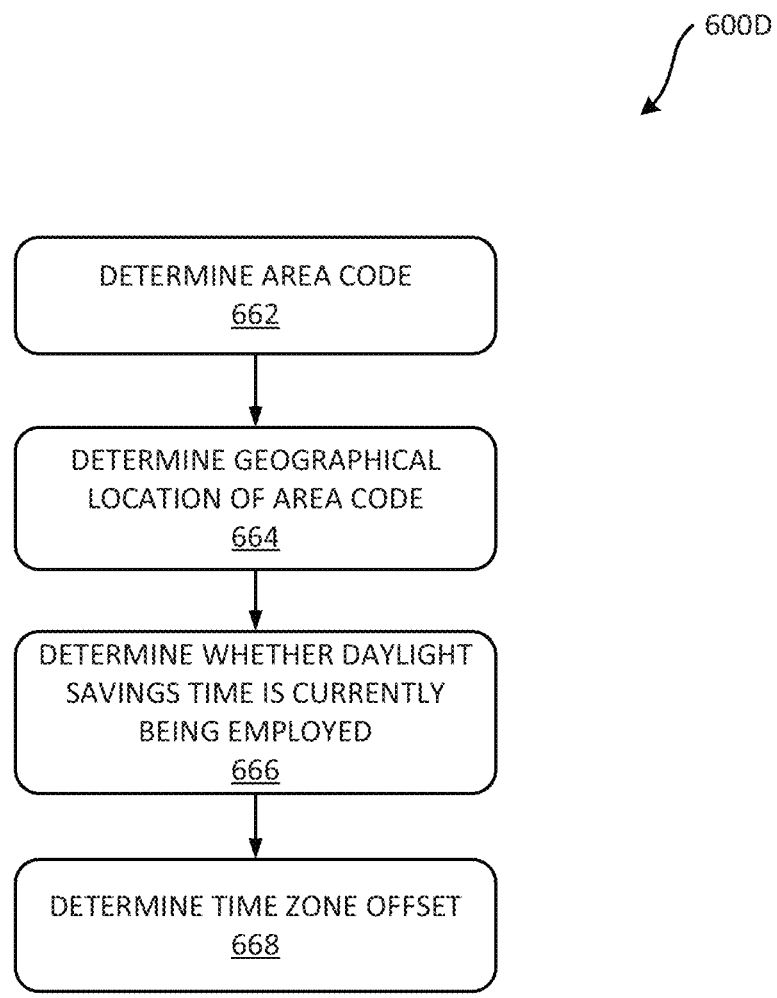
FIG. 6D is a flowchart of a process for determining the time-zone offset for a telephone number.

As discussed above, the time-zone offset for a particular TN may be calculated. Such a calculation may be used for some orders, such as orders discussed above with respect to block 608 of process 600A. For example, the time-zone offset may be determined when a TN is being ported from one carrier to another. FIG. 6D is a flowchart of a process 600D for determining the time-zone offset for a TN. Process 600D may begin with the determination of an area code for the TN (block 662). For example, a TN being ported may have the area code of "09846." The geographical location of the area code may also be determined (block 664). In the current example, process 600D may query validation table 308 to determine that the area code "08946" corresponds to Sydney. In this example, the country associated with the TN may already be known to process 600D or process 600D may query validation table 308 with the numerical country code. The operator may also confirm with the customer that the TN is associated with the geographic location determined by process 600D. For example, the operator may ask the customer, "Do you live in Sydney?"

Whether daylight saving time applies or not may be determined (block 666). In the current example, the current date and time may be compared to the DST range stored in field 526 for the corresponding area code and/or geographic region. In the case of record 552-5 (corresponding to area code 08946), daylight saving time applies between Oct. 2, 2011 and Apr. 1, 2012.

The time-zone offset may be determined (block 668). If the current time/date (determined at block 666) is in the DST range, then the offset in DST time-zone offset field 528 applies (block 668). If the current time/date (e.g., determined at block 666) is not in the DST range, then the offset in time-zone offset field 524 applies (block 668). For example, if the current date is Oct. 1, 2011, then, in the current example, DST is not being employed and the DST offset is +10 hours from GMT, as indicated in time-zone offset in field 524 of record 552-5. If the current date is Oct. 5, 2011, on the other hand, then in the current example, DST is currently being employed and the DST offset is +11 hours from GMT, as indicated in DST offset in field 528 of record 552-5.

In one embodiment, the geographical location of the area code does not have to be determined (block 664). In this embodiment, the link from the area code to the offset can be determined (e.g., the values linked) without reference to the geographic location stored in geographic name field 516.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A system comprising:
   a network device, associated with a communications service provider, including a memory to store:

a first database including a plurality of records, wherein each record in the first database stores a telephone number (TN) and multiple data fields, including a first data field identifying a current assignment status and a second data field identifying an assignment status history of the corresponding TN with respect to assignment by the communications service provider, wherein the first database stores in a single update field for an entirety of the plurality of records an indicator to indicate whether any one of the plurality of records in the first database was updated in response to a change to data in one or more of the multiple data fields; and a second database having a plurality of records, wherein each record in the second database indicates a range of consecutive TNs from the first database having a same assignment status history of the TNs that includes a first assignment status at a first date and a second assignment status at a second date, wherein the first assignment status and the second assignment status differ; and one or more processors to:
   run a first thread to update the one of the plurality of records in the first database and to indicate in the stored indicator that the one of the plurality of records in the first database was updated;
   run a second thread, different from the first thread, to:
      generate the second database from the first database in response to the stored indicator indicating that the one of the plurality of records in the first database was updated, and
      reset the stored indicator to indicate that none of the plurality of records in the first database has been updated since the generation of the second database.

2. The system of claim 1, wherein the second thread generates the second database from the first database in response to a change being made to data in any one of the multiple data fields of any of the plurality of records in the first database.

3. The system of claim 1, wherein the multiple data fields include a third data field identifying customer data associated with the corresponding TN, and
   wherein each of the consecutive TNs has the customer data in common.

4. The system of claim 3, wherein the customer data does not identify a customer.

5. The system of claim 1, wherein the first assignment status indicates that the TNs were granted at the first date and the second assignment status indicates the TNs were made available at the second date, and
   wherein the assignment status history includes a third assignment status at a third date, wherein the third assignment status indicates that the TNs were allocated at the third date.

6. A system comprising:
   a network device, associated with a communications service provider, including a memory to store:
      a first database including a plurality of records, wherein each record in the first database stores multiple data fields, including an area code, a maximum length for a telephone number (TN) corresponding to the area code, a minimum length for the TN corresponding to the area code, and an assignment status history of the TN with respect to assignment by the communications service provider, wherein the first database stores in a single update field for an entirety of the plurality of records an indicator to indicate whether any one of the records in the first database was updated in response to a change to data in one or more of the multiple data fields, and
      a second database having a plurality of records, wherein each record in the second database indicates a range of consecutive TNs from the first database having a same assignment status history that includes multiple statuses on respective dates that differ, with respect to each of the consecutive TNs being granted, being available, or being allocated; and
   one or more processors to:
      validate a length of a received TN against information stored in one or more of the multiple data fields in the first database,
      run a first thread to update the one of the plurality of records in the first database and to indicate that the one of the plurality of records in the first database was updated, and
      run a second thread, different from the first thread, to:
         generate the second database from the first database in response to the stored indicator indicating that the one of the plurality of records in the first database was updated, and
         reset the indicator to indicate that none of the plurality of records in the first database has been updated since the generation of the second database.

7. The system of claim 6, wherein each record in the first database stores information indicating a geographic name or region associated with the TN corresponding to the area code.

8. The system of claim 7, wherein the one or more processors validate the received TN by comparing a geographic area associated with the received TN and an area code associated with the received TN to the geographic name and area code stored in the first database.

9. The system of claim 8, wherein the one or more processors validate the received TN by determining whether a length of the received TN is greater than or equal to the minimum length stored in the first database and whether the length of the received TN is shorter than or equal to the maximum length stored in the first database.

10. The system of claim 9,
   wherein the memory is configured to store a database including telephone number area codes, associated time-zone offsets for each area code, and an indication of when and whether a geographic area associated with area code employs daylight saving time; and
   wherein the one or more processors are configured to determine an area code associated with a received telephone number, query the database to determine whether the determined area code is associated with a geographic area currently employing daylight saving time, and determine a time-zone offset based on the determined area code and the determination of whether the geographic area associated with the determined area code is currently employing daylight saving time.

11. The system of claim 6, wherein each record in the first database stores information indicating whether the TN corresponding to the area code is associated with a mobile line or a fixed line.

12. The system of claim 11, wherein each record in the first database stores information indicating a geographic name or region of the TN corresponding to the area code.

13. The system of claim 6, wherein the multiple data fields include a current assignment status of the TN with respect to the TN being granted, being available, or being allocated, and
   wherein each of the consecutive TNs has the current assignment status in common.

14. The system of claim 6, wherein the multiple data fields include customer data associated with the TN, and
wherein each of the consecutive TNs has the customer data in common.

15. The system of claim 14, wherein the customer data does not identify a customer.

16. A computer-implemented method comprising:
executing a first thread to update at least one data field in a record in a first database and to store an indicator, in a single update field for an entirety of a plurality of records in the first database in response to the update, wherein the first database includes a plurality of records, each record in the first database storing a telephone number (TN) and a number of data fields, including a first data field identifying an assignment status of the corresponding TN with respect to assignment by a communications service provider and a second data field identifying an assignment status history; and
executing a second thread, different from the first thread, to:
generate a second database from the first database in response to the stored indicator in the first database, wherein the second database stores a plurality of records, wherein each record in the second database indicates a range of consecutive TNs from the first database having a same assignment status history that includes multiple statuses on respective dates that differ, with respect to each of the consecutive TNs being granted, being available, or being allocated.

17. The computer-implemented method of claim 16, wherein the second thread generates the second database from the first database in response to a change being made to data in any one of the number of data fields of any of the plurality of records stored in the first database.

18. The computer-implemented method of claim 16,
wherein each record in the first database stores a name of a customer associated with the corresponding TN, and
wherein each record in the second database indicates a range of consecutive TNs from the first database having a same customer name.

19. The computer-implemented method of claim 16, further comprising:
determining an area code associated with a telephone number, wherein the area code is associated with a geographic location;
determining whether the geographic location associated with the area code is currently employing daylight saving time; and
determining a time-zone offset based on the area code and the determination of whether the geographic location associated with the area code is currently employing daylight saving time.

20. The computer-implemented method of claim 19,
wherein determining the time-zone offset includes querying a database to determine, based on the area code, the time-zone offset based on Greenwich Mean Time (GMT); and
wherein determining whether the geographic location associated with the area code is currently employing daylight saving time includes querying a database to determine whether the area code is associated with daylight saving time.

* * * * *